（12）United States Patent
Beaujot et al.

(10) Patent No.: US 9,578,800 B2
(45) Date of Patent: Feb. 28, 2017

(54) AIR SEEDER TANK AND DISTRIBUTION APPARATUS

(71) Applicant: SEEDMASTER MANUFACTURING LTD., Emerald Park (CA)

(72) Inventors: Norbert Beaujot, Regina (CA); Greg Vennard, Regina (CA); Neil Markham, Regina (CA)

(73) Assignee: Seedmaster Manufacturing Ltd., Saskatchewan (CA)

( * ) Notice: Subject to any disclaimer, the term of this patent is extended or adjusted under 35 U.S.C. 154(b) by 260 days.

(21) Appl. No.: 14/250,409

(22) Filed: Apr. 11, 2014

(65) Prior Publication Data

US 2014/0216315 A1 Aug. 7, 2014

Related U.S. Application Data

(62) Division of application No. 13/067,108, filed on May 9, 2011, now Pat. No. 8,733,257.

(30) Foreign Application Priority Data

Nov. 3, 2010 (CA) .................................... 2719827

(51) Int. Cl.
 *A01C 7/08* (2006.01)
 *A01C 7/06* (2006.01)
 *A01C 7/20* (2006.01)

(52) U.S. Cl.
 CPC ............... *A01C 7/06* (2013.01); *A01C 7/081* (2013.01); *A01C 7/084* (2013.01); *A01C 7/20* (2013.01); *Y02P 60/16* (2015.11)

(58) Field of Classification Search
 CPC combination set(s) only.
 See application file for complete search history.

(56) References Cited

U.S. PATENT DOCUMENTS

| | | | | |
|---|---|---|---|---|
| 1,770,641 A | * | 7/1930 | Brennan | A01C 19/00 111/67 |
| 3,149,588 A | | 9/1964 | Gatzke | |
| 4,611,545 A | * | 9/1986 | Nickeson | A01C 7/006 111/136 |
| 4,700,640 A | | 10/1987 | Andersson | |
| 5,357,884 A | * | 10/1994 | Bourgault | A01C 7/06 111/136 |
| 5,592,889 A | * | 1/1997 | Bourgault | A01C 15/006 111/174 |

(Continued)

OTHER PUBLICATIONS

U.S. Appl. No. 13/067,108, filed May 9, 2011; Beaujot et al.

*Primary Examiner* — Alicia Torres
(74) *Attorney, Agent, or Firm* — Nixon & Vanderhye P.C.

(57) ABSTRACT

An air seeder distribution apparatus has seed and fertilizer tanks, and a like plurality of metering devices mounted on each product tank. A manifold set comprises a like plurality of product manifolds and each manifold is separately fed from one metering device on each of the seed and fertilizer tanks. A control selectively starts and stops rotation of the feed roller of each metering device to feed product from either tank, or both tanks to the connected manifold. The weight of each tank can be displayed on a weight indicator. Balancing of the pressure in each supply conduit can be provided. A remote opener exerts downward force on the tank lid to maintain interior pressure.

8 Claims, 7 Drawing Sheets

(56) References Cited

U.S. PATENT DOCUMENTS

| | | | | |
|---|---|---|---|---|
| 5,601,209 | A | * | 2/1997 | Barsi ..................... A01C 7/044 |
| | | | | 111/179 |
| 5,915,313 | A | | 6/1999 | Bender et al. |
| 5,927,217 | A | | 7/1999 | Halford et al. |
| 5,996,516 | A | * | 12/1999 | Benneweis ............ A01C 7/081 |
| | | | | 111/176 |
| 6,285,938 | B1 | * | 9/2001 | Lang ..................... A01C 7/102 |
| | | | | 111/174 |
| 6,302,636 | B1 | | 10/2001 | Duron |
| 6,752,328 | B2 | | 6/2004 | Sauls |
| 6,899,042 | B1 | | 5/2005 | Kowalchuk |
| 7,104,207 | B2 | | 9/2006 | Wake et al. |
| 7,690,440 | B2 | | 4/2010 | Dean |
| 7,703,404 | B2 | | 4/2010 | Horn et al. |
| 8,141,504 | B2 | | 3/2012 | Dean et al. |
| 8,733,257 | B2 | | 5/2014 | Beaujot et al. |
| 2004/0016378 | A1 | | 1/2004 | Powell et al. |
| 2004/0025766 | A1 | | 2/2004 | Ostrander et al. |
| 2005/0241070 | A1 | | 11/2005 | Wake et al. |
| 2008/0163807 | A1 | * | 7/2008 | Dean ..................... A01C 7/127 |
| | | | | 111/11 |
| 2009/0078178 | A1 | * | 3/2009 | Beaujot ................. A01C 7/084 |
| | | | | 111/170 |
| 2009/0079624 | A1 | * | 3/2009 | Dean ..................... A01C 7/084 |
| | | | | 342/357.52 |
| 2009/0178600 | A1 | | 7/2009 | Horn et al. |

\* cited by examiner

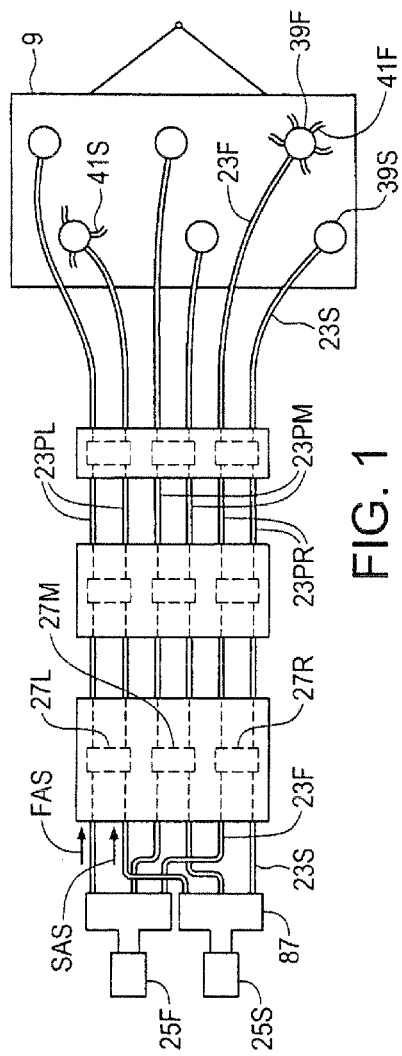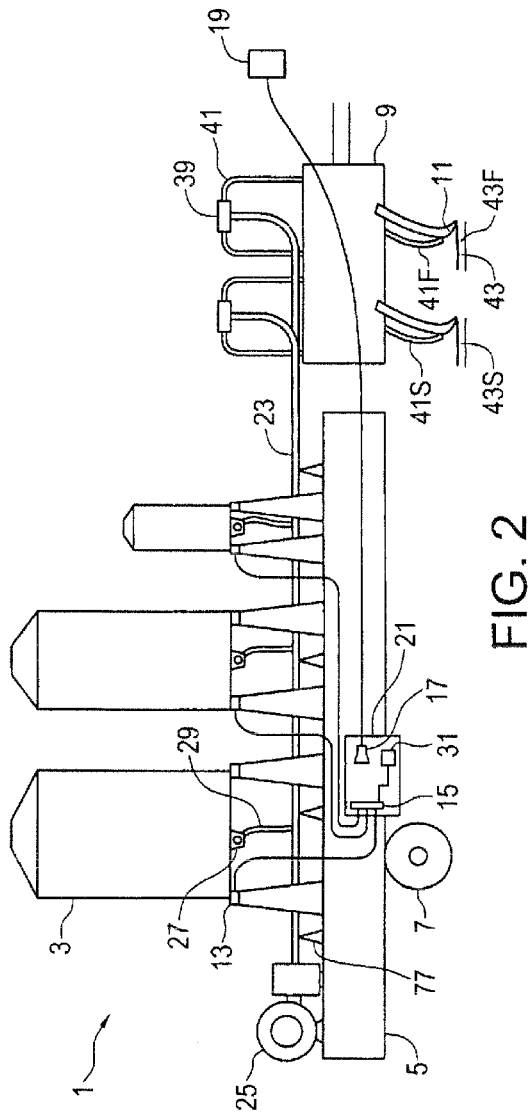

AIR SEEDER TANK AND DISTRIBUTION APPARATUS

This application is a divisional of application Ser. No. 13/067,108 filed May 9, 2011, which claims priority on CA 2,719,827 filed Nov. 3, 2010, the entire disclosures of which are all incorporated herein by reference in this application.

This invention is in the field of agricultural implements and in particular a product tank and distribution apparatus for an air seeder.

BACKGROUND

Air seeders typically include an implement frame mounted on wheels, with a plurality of furrow openers mounted on the frame. The furrow openers can be moved from a raised non-operative position to a lowered operating position where the furrow openers engage the ground and create furrows. Agricultural products such as seed and various types of fertilizer are carried in separate tanks which can be mounted on the implement frame or on a cart towed along with the implement frame.

The application rate of the various products varies significantly from as low as about three pounds per acre to 300 pounds per acre or more. In order to keep track of the amount of product remaining in each tank it is known to provide sight glasses or low level alarms to measure product remaining in the tank, or at least warn when a tank is approaching empty. Cameras are also sometimes used in the tank so the operator can visually monitor the product quantity, and it is further known to mount load cells under a tank and provide a readout of the weight of product in the tank. Present product containers for air seeders however, are typically are built with a number of compartments in a single tank assembly. The assembly thus contains a number of tanks separated by walls, and it is thus not possible to weigh the product in each tank, but only the entire tank assembly.

Metering devices dispense products from the tanks into one or more air streams that carry the products through a network of hoses and manifolds to the furrow openers where same are deposited in the furrows. Most modern air seeders have furrow openers that deliver seed to seed furrows and fertilizer to separate fertilizer furrows. These may be totally separate furrow openers mounted on separate shanks, such as mid row fertilizer banding furrow openers which are remote from the seed furrow openers, or combination furrow opener where a single shank supports a furrow opening tool that makes one furrow for seed and a separate furrow for fertilizer. There are also then two separate distribution networks, one delivering product from selected ones of the tanks to the seed furrows, and one delivering product from selected ones of the tanks to the fertilizer furrows.

The terms "seed" and "fertilizer" are not meant restrictively, since in many cases some fertilizer is metered into the air stream carry the seed, and also in some instances it may be that fertilizer may be directed into the "seed" furrows, and vice versa if conditions warrant it. The terms "seed" and "fertilizer" are simply convenient to differentiate the two separate "runs" or air streams. Basically in an air seeder it is desirable to be able to direct agricultural product from any of the tanks into any of the available air streams.

The wide range of application rates applies not just to total product but also to the product mix. When seeding canola for example the application rate of canola seed may be three pounds per acre while fertilizer is applied at 300 pounds per acre. It is desirable then to use a smaller product tank for canola seed, and direct the seed from that tank to the seed air stream for carriage to the seed furrows. On the other hand when seeding peas for example the application rate of pea seed may be 200 pounds per acre while fertilizer is applied at 50 pounds per acre, and it is then desirable to use one or more larger product tanks for pea seed, and direct the seed from those tanks to the seed air stream for carriage to the seed furrows. Thus the frequency of the need to stop and fill when one tank is empty can be reduced.

In a typical air seeder a metering roller, auger, or the like dispenses product from each tank into an air stream. A conduit or the like generally connects the air stream to the top of the interior of the tank to pressurize the tank so that there is no pressure differential between the tank and the air stream which would put back pressure on the product as it is being metered into the air stream. This requires that the lid on the tank fill opening is sealed and clamped when closed.

The air stream carries the product through a primary hose to a manifold where the air stream and product is divided and directed into multiple secondary hoses connected to the manifold outlet ports. In some arrangements each secondary hose connects into a further manifold and the air stream is divided again into further final hoses leading to each furrow opener. It is desired to have an equal product quantity in each of the secondary hoses to provide equal product quantity in each of the final hoses, however the secondary and final hoses are typically of varied lengths. A longer hose will exert more back pressure and resistance to flow from the manifold compared to a shorter hose, and so air and product flows from the manifold are unequal as the longer hoses have a reduced flow and the shorter hoses have increased flow. In addition, manifolds of various sizes are also often used on one air seeder, for example some of the manifolds may have six outlets, and some eight outlets, to conveniently match the number of openers on the air seeder. As a result different pressures in the different sized manifolds again contribute to uneven distribution to the furrow openers.

Wider air seeders require more furrow openers and therefore more manifolds. Thus it is also known to divide product by delivering product from different sections along the length of a continuous meter roller into different air streams in different primary hoses, and then into manifolds. With this system, it is desirable to have the air pressure at the metering area to be the same for all primary hoses, so that reverse air flow through the meter won't affect the metered rate in one primary hose compared to another. To help achieve this balanced pressure all primary hoses are typically the same length.

Dividing at the meter roller reduces the number of manifolds required, but with a continuous meter roller divided into sections, sealing between sections is problematic and air and product can cross over from one meter section to another section, reducing the desired uniformity of metered product distribution to each opener.

In order to reduce overlap in very wide air seeders it is further desirable to be able shut off the supply of product to sections of the air seeder. It is known to use gate mechanisms for shutting off flow of product from the tank to a section of a continuous meter roller however these gate type shut off mechanisms result in product flow on/off lead times that are difficult to deal with. The product between the gate and the meter roller continues to be metered until it is used up, even after the gate is closed. For products that are metered at a low rate, it takes a significant time for the product to stop flowing to the furrow openers. Again for these products, when the gate is re-opened it takes some time for the meter to turn enough to start dropping product into the air stream. Such a gated meter is disclosed for example in U.S. Pat. No. 7,690,440 to Dean.

In some air distribution systems gate mechanics are also used to direct the product from one metering device to either the seed air stream or the fertilizer air stream. Again sealing such gates is difficult and air can pass between the seed and fertilizer air streams, especially when the speed and pressure of one air stream is significantly greater than the other. When seeding low rates of light seed like canola, it is desirable to have a low air speed and pressure, while often at the same time it is desired to apply a high rate of fertilizer which requires a high air speed and pressure to carry the high product volume through the system. When two different pressures and air speeds enter such a gated meter system, the air crosses over from the fertilizer to the seed side resulting in increased air speed on the seed air stream and reduced air speed in the fertilizer air stream.

SUMMARY OF THE INVENTION

It is an object of the present invention to provide an air seeder product tank and distribution apparatus that overcomes problems in the prior art.

In a first embodiment the present invention provides an air seeder distribution apparatus comprising a seed product tank and a fertilizer product tank mounted on a frame for movement along the ground with an air seeder, and a plurality of seed metering devices mounted on the seed product tank, and a like plurality of fertilizer metering devices mounted on the fertilizer product tank. Each metering device comprises a feed roller rotatably mounted in a housing and operative, when the feed roller thereof is rotating, to dispense a product flow from the product tank. A control is operative to selectively start and stop rotation of the feed roller of each metering device. A manifold set comprises a like plurality of product manifolds, each product manifold having an input port and a plurality of output ports. A like plurality of supply hoses each carries an air stream and extends under one of the plurality of seed metering devices and under one of the plurality of fertilizer metering devices. An output end of each supply hose is connected to the input port of one of the plurality of product manifolds in the manifold set. The product flow from each metering device can be directed through a feed conduit into the supply hose extending thereunder.

In a second embodiment the present invention provides an air seeder tank and distribution apparatus comprising a product tank with a single compartment for carrying a single product, the product tank mounted on a frame for movement along the ground with an air seeder. A weight sensor is mounted between the product tank and the frame such that a weight of the product tank is displayed on a weight indicator. A supply hose extends under the product tank and is supported on the frame independent of the product tank. A pressurized air source is connected to the supply hose and directs an air stream into the supply hose. A metering device is operative to dispense product from the product tank and a flexible feed conduit is connected at an upper end thereof to an output of the metering device and connected at a lower end thereof to the supply hose such that product dispensed from the metering device is directed into the supply conduit.

In a third embodiment the present invention provides an air stream balancing apparatus for an air seeder. The apparatus comprises an enclosure with a plurality of output ports and an input port connected to receive an air stream from a pressurized air source of the air seeder into the enclosure, and a plurality of output conduits. Each output conduit is connected at an input end thereof to an output port through a connection orifice to receive the air stream from the enclosure, and is connected at an output end thereof to a downstream element of a distribution network of the air seeder. The cross-sectional area of the connection orifices is unequal.

In a fourth embodiment the present invention provides a remotely controlled lid apparatus for a fill opening on a product tank of an air seeder. The apparatus comprises a lid movably attached to the product tank adjacent to the fill opening such that the lid can move from an open position, where the fill opening is open for filling the product tank, to a closed position where the lid covers the fill opening. A seal is operative to provide a seal between the lid and edges of the fill opening, and an actuator is operative to move the lid between the closed position and the open position, and operative to exert a downward force on the lid against the seal when the lid is in the closed position.

The present invention provides a plurality of completely individual and isolated meter devices, with independent drives, on a single tank. Each meter device can dispense independently from the tank to an individual manifold, and the metering rate for each metering device can be set differently for different sized manifolds. For example a meter device feeding a manifold with six outlets would dispense a rate that is 75% of a meter device feeding a manifold with eight outlets. With the use of isolated meter devices, the air stream pressure in the primary hoses from the meter devices to the manifolds can be set differently on different hoses to better suit the manifold size and hose length to the manifold. Product flow to individual manifolds can also be shut off and on instantly by disengaging the individual drive of a metering device. Further, the seed air streams and tanks are completely isolated from the fertilizer air streams and tanks, so there is no danger of air and/or product crossing over. As a result, largely different air speeds and pressures can be successfully used in the seed and fertilizer air streams.

The present invention further provides a simple and economical apparatus for accurately monitoring the product weight in an air seeder product tank during operation and also while filling the tank.

The present invention further provides a remotely controlled lid for a product tank fill opening. Conveniently the system uses hydraulic force from the implement hydraulic system, typically from the hydraulic conduits feeding the hydraulic drive fan, to exert a constant force against the compressive seal member. The downward force on the lid automatically compensates for structural changes over time by uniformly applying a downward force when in the seeding mode, thereby ensuring a good seal and reduced risk of air leaking from the tank and bleeding pressure from the air stream.

The present invention further provides a system for balancing the flow of air and agricultural products in each conduit of an air seeder distribution network. A choke gate on manifold outlets is adjustable for the purpose of balancing the back pressure from hoses of different lengths and thereby increases the uniformity of product flow from the manifold into each hose. The choke gate adjustment increases the back pressure on shorter output hose lengths to match that of longer output hoses, and is typically only set once to match output hose length variation requirements. The same choke system can be used to balance overall flow in primary hose to a given manifold where multiple manifolds and primary hoses are used. When multiple manifolds are used, the air and product flow to the individual manifolds may also vary due to variations in primary hose length. Again, longer hoses result in higher back pressure and lower flow. By choking a complete manifold on shorter primary hose lengths, a balanced air and product flow can be achieved. A similar system can be used at the plenum where a fan output is divided into numerous supply hoses.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic top view of an embodiment of an air seeder tank and distribution apparatus of the present invention;

FIG. 2 is a schematic side view of the embodiment of FIG. 1;

DETAILED DESCRIPTION OF THE ILLUSTRATED EMBODIMENTS

Figure 3:
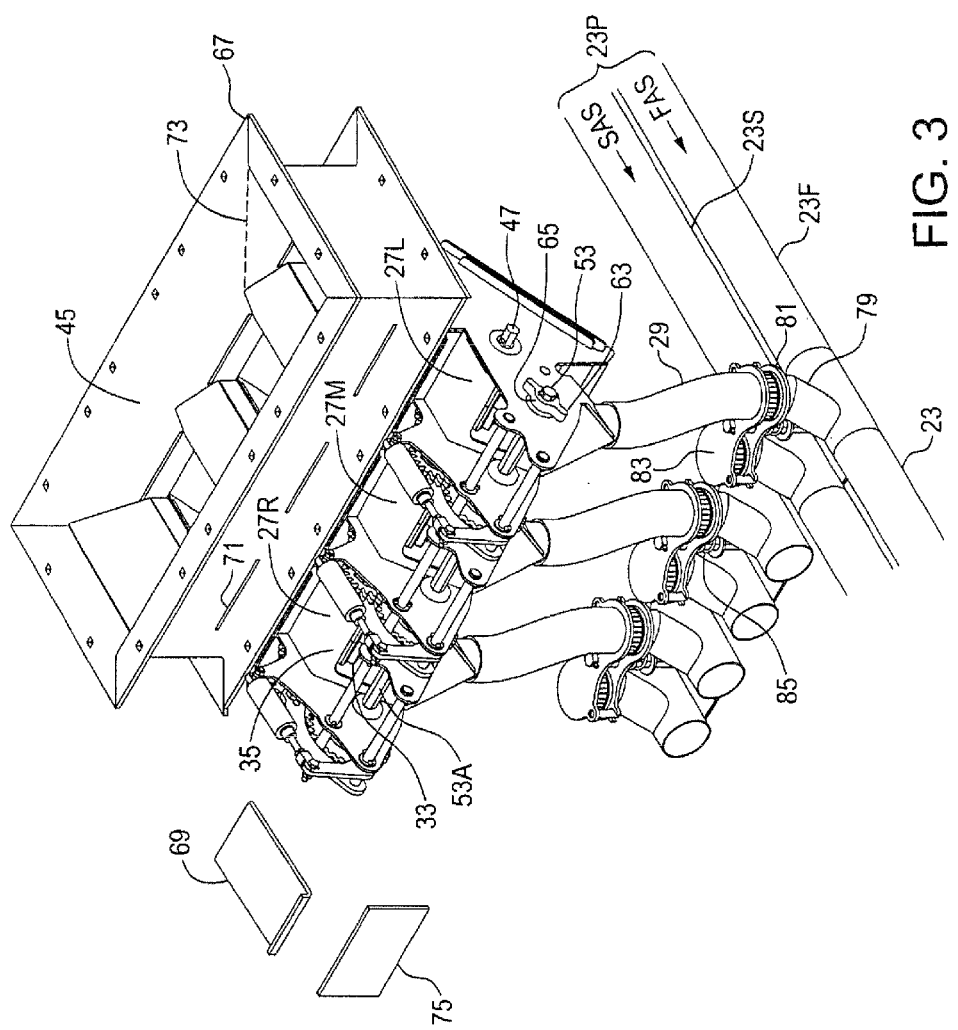
FIG. 3 is a perspective front view of an embodiment of a metering apparatus of the present invention.

FIGS. 1 and 2 schematically illustrate an embodiment of an air seeder tank and distribution apparatus 1 of the present invention for use with an air seeder. Commonly such air seeders will have two to four different tanks for carrying agricultural products to be applied on a filed. Conventionally, these tanks are generally formed by dividing a large container into separate tanks by providing walls to form separate compartments. In contrast, the illustrated apparatus 1 is shown with three product tanks 3, each with a single compartment for carrying a single product, and each mounted separately to a frame 5 for movement along the ground with an air seeder. In the illustrated apparatus 1, the frame 5 is mounted on wheels 7 to form an air seeder cart towed behind the air seeder implement 9 which carries the furrow openers 11. Alternatively, as is known in the art, one or more of the product tanks can be carried on the air seeder implement 9.

A weight sensor 13 is mounted between each product tank 3 and the frame 5 such that a weight of each product tank 3 is displayed on a weight indicator 15. The weight sensor 13 is schematically illustrated as a common load cell under each corner of each tank 3, with leads from the load cells under each tank 3 to the weight indicator 15, however other weight sensors as are known in the art are contemplated for use as well.

The illustrated weight indicator 15 is located adjacent to the frame 5 visible to an operator filling a product tanks with product. A readout on the weight indicator 15 shows the weight of each tank 3. While a similar indicator could be provided in the cab of the tractor so as to be visible to the operator during field operations, these indicators are costly and the illustrated apparatus 1 instead uses an economical camera 17 focused on the weight indicator 15 and transmitting a view of the weight indicator to a display 19 visible to the operator. The weight indicator 15 and camera 17 could be enclosed in a sealed enclosure 21 to prevent dust from obscuring the camera and to protect the equipment. The enclosure 21 could have a transparent wall, or could have a lid that opens so the operator can see the weight indicator 15 when filling the product tanks 3.

A plurality of supply hoses 23 extend under the product tanks 3 from the rear end to the front end of the frame 5. The supply hoses 23 are supported on the frame 5 independent of the product tanks, and a pressurized air source, illustrated as fans 25, is connected to each supply hose and directs an air stream into each supply hose 23.

Metering devices 27 are operative to dispense products from each product tank 3, and a flexible feed conduits 29 is connected at an upper end thereof to the output of each metering device 27 and is connected at a lower end thereof to one of the supply hoses 23 such that product dispensed from each metering device 27 is directed into one of the supply conduit 23.

Thus the tanks 3 and supply hoses 23 are fixed to the frame 5 independently and are connected only by the flexible feed conduits 29 which will transfer negligible force from the tanks 3 to the supply hoses 23, and therefore not affect the weight of the tanks 3 as sensed by the weight sensors 13.

The illustrated apparatus 1 also shows a microprocessor 31 operative, during field operations, to periodically receive weight information from the weight indicator 15 and compare actual product usage with a target product usage input by the operator. The microprocessor will be programmed with the width of the air seeder implement 9 and will receive ground speed and travel distance information and be able to compare the actual weight of product applied over a known field area with the desired application rate, and could be operative to display the difference to the operator, or could be programmed to control the metering devices 27 to adjust actual product usage to the target product usage.

Figure 5:
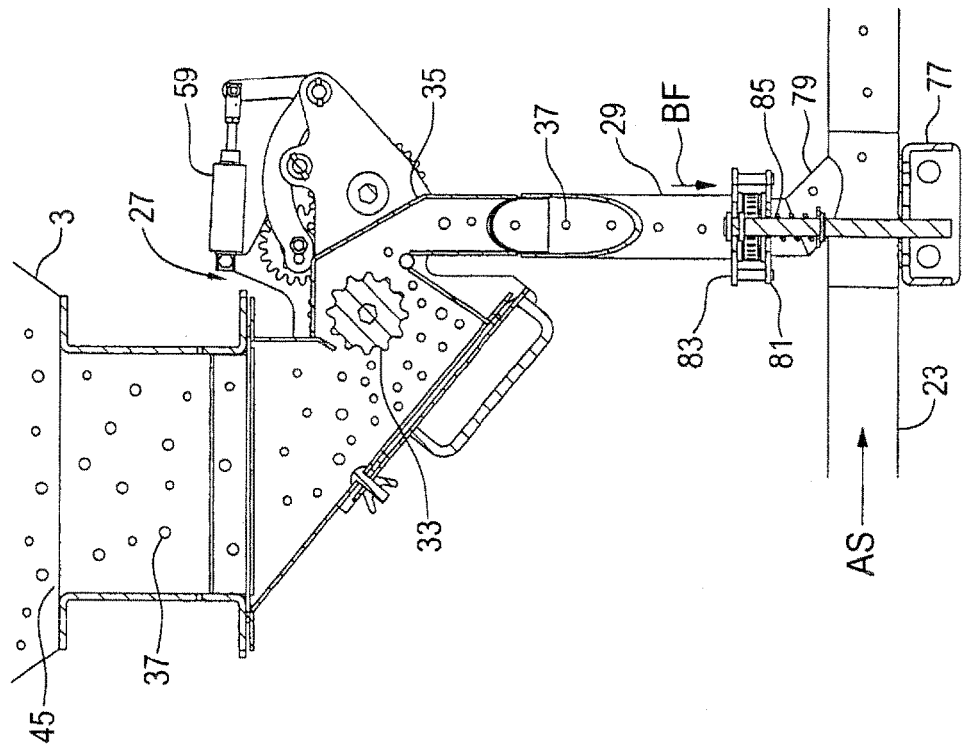
FIG. 5 is a sectional side view of the metering apparatus of FIG. 3.
Figure 4:
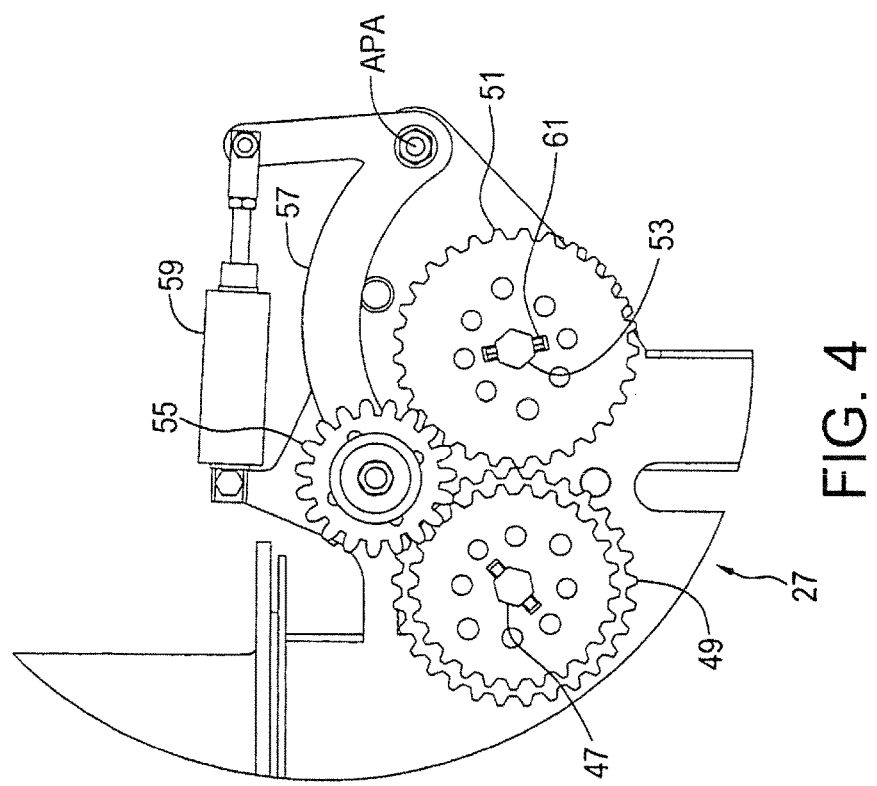
FIG. 4 is a side view of the drive of the metering apparatus of FIG. 3.
Figure 7:
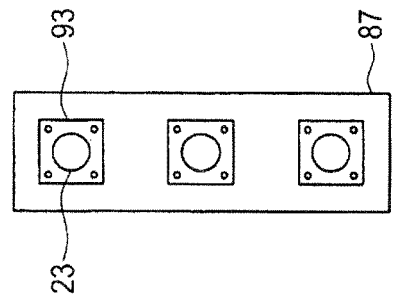
FIG. 7 is a schematic end view of the fan plenum and attached supply hoses of FIG. 6.
Figure 6:
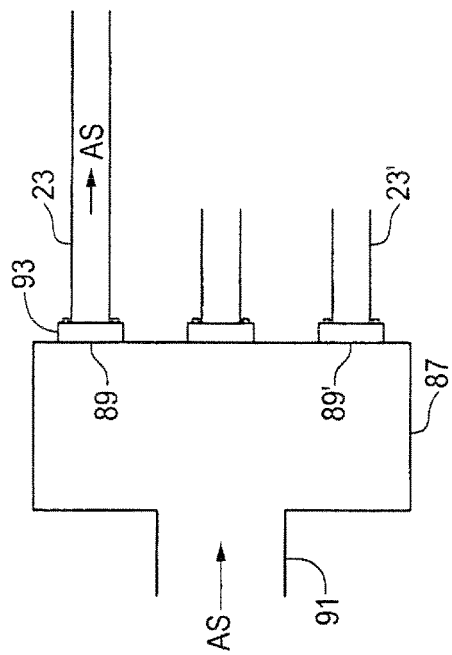
FIG. 6 is a schematic top view of the fan plenum and attached supply hoses of the embodiment of FIG. 1.
Figure 8:
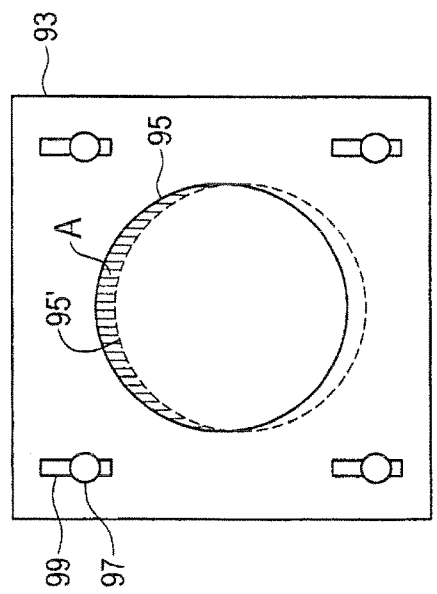
FIG. 8 is a schematic end view showing the alignment and misalignment of the plenum output ports and the supply hoses to change the cross-sectional area of the connection orifice.
Figure 10:
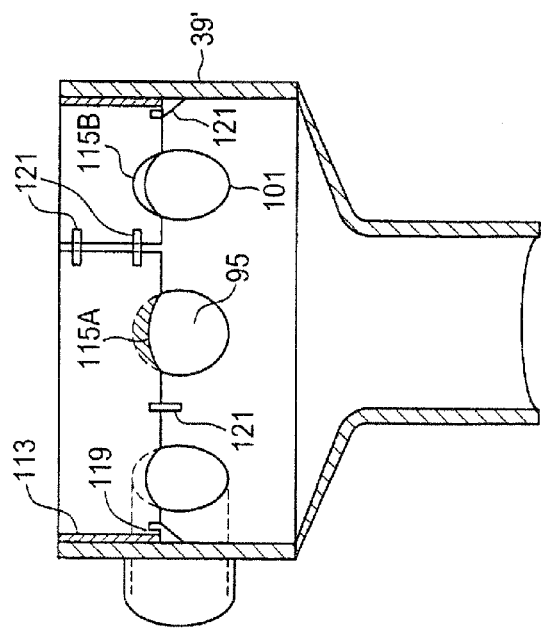
FIG. 10 is a schematic side view of an alternate manifold apparatus with a choking sheet installed inside the manifold to reduce the size of the connection orifice at some selected ones of the output ports to balance the back pressure at all output ports.
Figure 9:
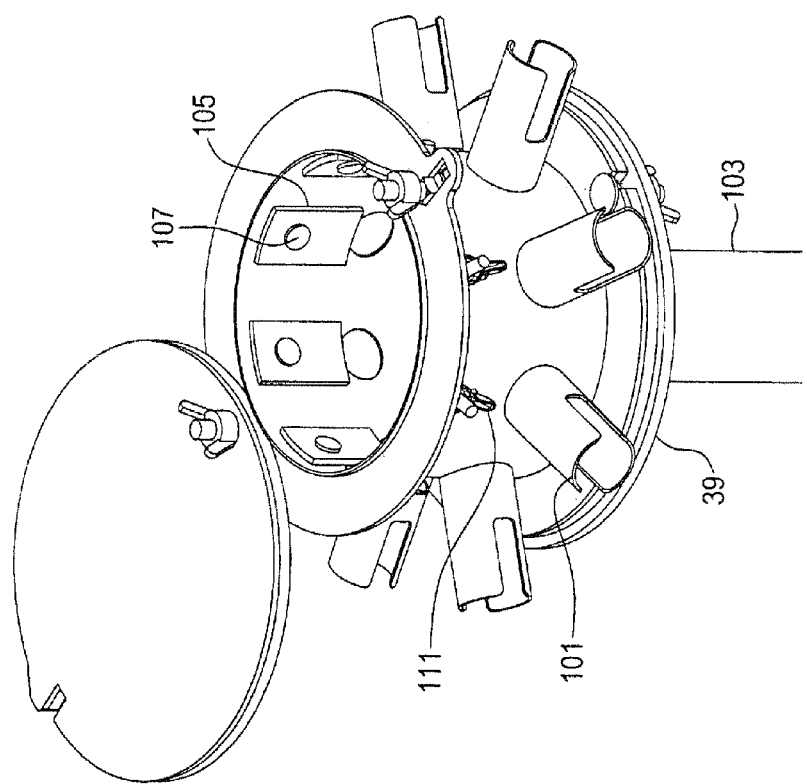
FIG. 9 is a perspective view of a manifold apparatus of the present invention where the size of the connection orifice at the output ports can be adjusted by moving gate flaps to balance the back pressure at all output ports.
Figure 11:
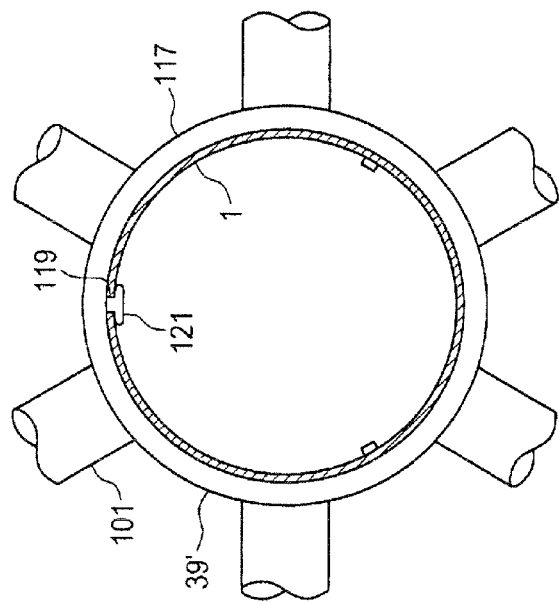
FIG. 11 is a schematic top view of the manifold apparatus of FIG. 10.
Figure 12:
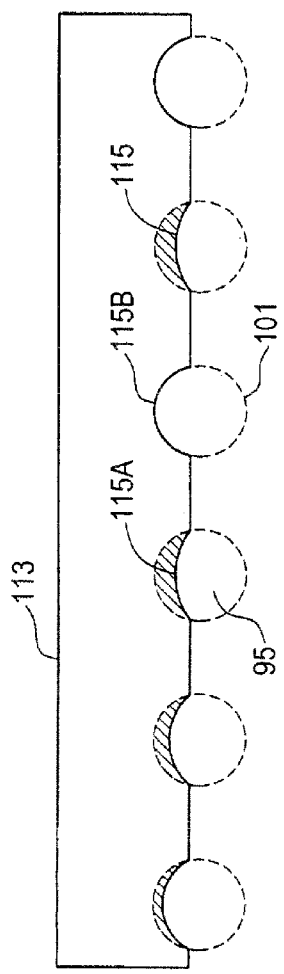
FIG. 12 is a schematic view of a choking sheet for use with the apparatus of FIG. 10, with the sheet laid out flat.

The illustrated air seeder tank and distribution apparatus 1 has three separate metering devices 27, as illustrated in FIGS. 3-5, under each product tank 3. Each metering device 27 comprises a feed roller 33 rotatably mounted in a housing

35. Each metering device is operative, when the feed roller 33 thereof is rotating, to dispense a flow of agricultural product 37 from the product tank 3 into a supply hose 23 extending thereunder. A control is operative to selectively start and stop rotation of the feed roller 33 of each metering device 27.

Each supply hoses 23 extends under a corresponding metering device 27 on each product tank 3. The fan 25 directs an air stream AS through the supply hoses 23, each of which is connected at an output end thereof to the input port of a product manifold 39. The air stream carries the dispensed product through the supply hose to the manifold 39. The manifold 39 divides the air stream AS and the agricultural products entrained therein, into final hoses 41, each connected to an output port of the manifold 39 to deliver the air stream AS and products to a furrow 43 made by a furrow opener 11.

In the illustrated apparatus 1, the housing 35 of each metering device 27 is mounted under an open bottom 45 of the product tank 3 such that the right, middle, and left metering devices 27R, 27M, and 27L are oriented side by side across the open bottom 45 of each product tank 3.

In the illustrated apparatus 1, the three product tanks 3 are mounted from along the length of the frame 5, and a seed supply hose 23S and a fertilizer supply hose 23F extend side by side to form a supply hose pair 23P extending under each metering device 27 from the rear portion of the frame 5 to a front portion of the frame 5 as illustrated. Thus right, middle, and left supply hose pairs 23PR, 23PM, 23PL extend under the corresponding right, middle, and left metering devices 27R, 27M, and 27L of each product tank 3, and then forward to the manifold sets mounted on the furrow opener carrying implement 9 of the air seeder. As described in more detail below, the flow of material dispensed from each metering device 27 can be directed into either the seed hose 23S or the fertilizer hose 23P of the hose pair 23P running under the device and be delivered to a corresponding manifold 39S or 39F connected to the supply hose.

As can be seen in FIG. 1, the seed air stream SAS carried through the seed supply hose 23S is provided by the seed fan 25S while the fertilizer air stream FAS carried through the fertilizer supply hose 23F is provided by the fertilizer fan 25F. Output ends of each seed hose 23S are connected to one of the seed manifolds 39S of the seed manifold set, for example mounted across the rear portion of the implement 9 as shown in FIG. 1, while output ends of each fertilizer hose 23F are connected to one of the fertilizer manifolds 39F of the fertilizer manifold set mounted across the front portion of the implement 9. Final hoses 41S connected to the output ports of the seed manifolds 39S deliver product into seed furrows 43S made by the furrow openers 11, and final hoses 41F connected to the output ports of the fertilizer manifolds 39F deliver product into fertilizer furrows 43F made by the furrow openers 11.

Thus the apparatus 1 has a seed distribution network carrying the seed air stream SAS and comprising the seed fan 25S, seed supply tubes 23S, a set of seed manifolds 39S, and final hoses 41S and a completely separate fertilizer distribution network carrying the fertilizer air stream FAS and comprising the fertilizer fan 25F, fertilizer supply tubes 23F, a set of fertilizer manifolds 39F, and final hoses 41F. Agricultural products from each tank 3 can be metered into either one of the distribution networks, such that any product tank 3 can be used to carry either seed or fertilizer, and the product with the highest application rate can be carried in the largest product tank 3. Similarly the same product may be carried in two separate tanks 3, and a portion of the required application rate for that product would be metered from each tank into the appropriate supply hoses.

Again reference to "seed" and "fertilizer" is only for convenience to differentiate one distribution network from the other, as typically one of the pair of supply hoses will carry seed and the other will carry fertilizer, but either supply hose could be carrying either product.

For illustration purposes the illustrated apparatus 1 shows three metering devices 27, however for the typical wider air seeders presently common there will more commonly be from six to ten metering devices 27 attached along the bottom of each tank 3 and corresponding supply hose pairs 23P extending thereunder. Since on each product tank 3 there is one metering device 27 for each manifold, a wider implement will require more manifolds and therefore more metering devices.

The same number of metering devices 27 is mounted on each product tank 3, and in each of the seed and fertilizer distribution networks, the number of supply hoses 23 and manifolds 39 is the same as the number of metering devices on each product tank 3.

With the control operative to start and stop rotation of the feed roller 33 of each metering device 27 independently of the feed rollers of the other metering devices, delivery of agricultural products to each manifold can be started and stopped independently of the other manifolds. The control will typically be configured to substantially simultaneously start and stop rotation of the feed rollers 33 of all metering devices 27 dispensing agricultural products into a selected supply hose 23 to stop all product flow to the corresponding manifold 39 fed by the supply hose. By arranging the furrow openers 11 fed by each manifold 39 in sections in order across a width of the implement 9, delivery of agricultural products to those sections of furrow openers 11 passing over previously seed ground can be stopped.

In the illustrated metering devices 27, a rotating driveshaft extends across the metering devices 27 and is operative to rotate the metering devices. The control is operative to start and stop rotation of the feed roller 33 of each metering device 27 by engaging and disengaging a shaft 47 of each feed roller 33 with the driveshaft.

Each metering device 27 comprises a feed roller 33, as seen in the cut away view of FIG. 4, mounted on a roller shaft 47. As seen in FIG. 4 driven sprocket 49 is mounted to the same shaft 47. Drive sprocket 51 is mounted to a drive shaft 53 extending across the open bottom 45 of the product tank 3 that is rotated by a hydraulic motor, electric motor, ground drive, or the like at a speed controlled to dispense whatever application rate is desired. Middle sprocket 55 is rotatably mounted to drive arm 57 which is pivotally mounted to the metering device 27 at arm pivot axis APA. Extendable actuator 59 is connected to the drive arm 57 such that retracting the actuator 59 moves the middle sprocket 55 down to mesh with the front and driven sprockets 49, 51, such that the rotating drive sprocket 51 causes the driven sprocket 49, the roller shaft 47, and the feed roller 33 to rotate and dispense product.

Thus the drive sprocket 51 is mounted on the drive shaft 53 adjacent to each metering device 27, and the driven sprocket 49 is mounted on the shaft 47 of each feed roller 33, and the middle sprocket 55 is movable from an engaged position, where the middle sprocket 55 engages, as illustrated in FIG. 4, the drive sprocket 51 and the driven sprocket 49 to rotate the feed roller 33, and a disengaged position where the middle sprocket is above and disengaged from the drive and driven sprockets 51, 49. The actuator 59 is operative to move the middle sprocket 55 between the engaged and the disengaged positions. The control is operative to activate the actuator 59, and is typically provided by a manual signal from the operator or by a position mapping system, such as a global positioning system, which determines that the particular metering device 27 should be on or off.

Retracting the extendable actuator 59 moves the middle sprocket 55 up such that the driven sprocket 49, and thus the feed roller 33, stop rotating and product flowing into the hose 23 stops immediately. Similarly when the actuator 59 is extended, the sprocket 49 and feed roller 33 begin rotating and product immediately begins to flow again. This very quick response time provides improved accuracy when shutting down sections of an air seeder to avoid overlap. Each metering device 27 on each tank 3 can be controlled independently of any other metering device 27.

It is contemplated that electric clutches or extendable actuators, or a hydraulic cylinder with pressurized oil supply, or any like actuator could be used but the actuator 59 is very conveniently and economically provided by an extendable pneumatic cylinder supplied by compressed air from a compressor mounted on the tractor or air seeder. These pneumatic cylinders are fast acting, which also increases the accuracy of the or/off switching times, and can be controlled easily with electrically activated solenoid valves.

The drive shaft 53 extending across the open bottom 45 of the product tank 3 is made up of a drive shaft section 53A on each metering device 27. The sections 53A of adjacent metering devices 27 are connected to each other by pins 61 extending laterally from the drive sprocket 51 on one metering device 27 and engaging lugs 63 on a coupler 65 attached to the end of the drive shaft section 53A on the adjacent metering device 27.

The drive shaft 53 requires only low torque and low speed and this "loose" connection of lugs 63 and pins 61 provides for smooth transfer of rotation from one drive shaft section 53A to the next while allowing considerable tolerances in placement. This connection also allows any metering device 27 to be removed from a location between adjacent metering devices on each side thereof simply by removing the bolts mounting the metering device to a meter mounting channel 67, by rotating the drive shaft section 53A so that the pins 61 pass between the lugs 63 on the adjacent coupler 65, and sliding the metering device 27 forward. The illustrated meter mounting channel 67 attaches to the open bottom 45 of the product tank 3 to facilitate mounting the metering devices 27 to the tank 3.

Thus any metering device 27 can be removed for service or repair. To prevent product from flowing out when the metering device is removed a blocking plate 69 can be inserted into a slot 71 defined in the meter mounting channel 67 above each metering device 27. This feature of the present metering system also allows the same tank 3 to be used for a wide variety of air seeder widths. Where a narrower air seeder is used, fewer manifolds 39 are required and thus also fewer metering devices 27. The tank can then be configured to accept the maximum contemplated number of metering devices 27, and where fewer metering devices are used, a blocking plate 69 is inserted and a sloped roof member 73 can be placed above the blocking plate 69, as outlined in dotted lines in FIG. 3, such that product in the tank flows to the adjacent metering device 27. The metering devices 27 will be placed adjacent to each other starting at the driven end of the driveshaft 53, until the desired number is in place. The drive shaft sections 53A of adjacent metering devices 27 will thus engage and drive the feed rollers 33. Alternatively a drive shaft extension could be inserted across a gap representing an omitted metering device 27.

The slots 71 are covered by a flexible magnetic sheet 75, similar to a fridge magnet, when the apparatus 1 is operating to prevent the escape of pressurized air from the supply conduits 23 up through the metering device 27.

Conveniently as well the driven and drive sprockets 49, 51, can be changed to change the dispensing rate of one metering device relative to an adjacent metering device. In fact in the illustrated metering device 27, the driven and drive sprockets 49, 51 can be conveniently interchanged. Where for example the illustrated configuration with the large sprocket driving and the smaller sprocket driven supplies desired application rate to a manifold 39 with eight outlets, reversing the sprockets 49, 51 so the smaller one is the drive sprocket and the larger sprocket is the driven sprocket provides a dispensing rate that is 75% of the desired application rate, which is ideal to supply a manifold 39 with six outlets, so that the same amount of product flows in each of the six final hoses 41 as flows in each of the eight final hoses 41.

The outlet of each metering device 27 is connected to the top end of a length of flexible feed conduit 29. The supply hose pairs 23P are supported on the frame 5 of the air seeder on supports 77 under the metering devices 27 and a connector hose 79 extends up from a Y-fitting in each supply hose 23 of the hose pair 23P. A switching mechanism is operative to connect a lower end of the feed conduit 29 to an upper end of a selected one of the Y-fittings in the supply hoses 23S, 23F, and is operative to seal the upper end of the other unselected one of the Y-fittings.

To provide the switching mechanism in the illustrated embodiment, the top end of each connector hose 79 is fixed to a transition plate 81 with openings corresponding to the open top ends of the connector hoses 79, A switching plate 83 is urged downward against the top of the transition plate by a bias force BF exerted by a spring 85 and a seal between the transition plate 81 and the switching plate 83 prevents pressurized air from leaking from the supply hoses 23.

The lower end of the flexible feed conduit 29 is connected to an opening in the switching plate 83 such that product can pass from the conduit 29 through the switching plate 83 and into an aligned one of the connector hoses 79. FIG. 3 illustrates the feed conduits 29 aligned with connector hoses 79 leading to fertilizer supply hoses 23F. The switching plate 83 may also be lifted somewhat against the bias force BF and rotated half a turn to align the flexible feed conduit 29 with the other of the connector hoses 79 to deliver product to the seed supply hose 23S. Thus the metering devices 27 on each tank can be connected to either of the supply hoses 23S, 23F. The switching plate 81 can also be turned one quarter turn to direct the product dispensed into a container to be weighed for calibration purposes.

With the use of isolated meter systems for each product tank 3, the air pressure in the supply hoses 23S, 23F can be set differently to better suit application rates. It is also contemplated that an air gate could be introduced at the inlet to a supply hose 23 so air pressure could be adjusted for example, in one fertilizer supply hose 23F compared to an adjacent fertilizer supply hose 23F to compensate for varying supply hose length, manifold size, etc. so long as the pressure differential is not so high as to leak significant amounts of air up through the metering device 27 on the higher pressure hose through the product 37 in the tank 3 to the lower pressure hose.

The disclosed metering system thus has significant advantages. By using completely individual meter sections to match the number of manifolds, gearing or meter speed can be set differently for different primary runs to balance the product requirement to match the different manifold sizes being used. Product flow to individual manifold sections can be shut off and on instantly by disengaging the individual drive. The seed runs and tanks are completely isolated from the fertilizer runs and tanks, so there is no danger of air and/or product crossing over. As a result, largely different air speeds and pressures can be successfully used.

When seeding with air conveying systems, such as apparatus 1, each supply hose 23 feeds product to a manifold 39. The manifold 39 splits the product into multiple output ports and into final hoses 41 connected to these ports. When the resistance to flow at each outlet port, or the "back pressure", is substantially equal, the air stream entering the manifold 39, and the agricultural products entrained therein, flows out of the manifold substantially equally through each port, as is desired to deliver equal amounts of product to each furrow 43.

When the final hoses 41 are of varied lengths, it introduces a variation in product flow from the manifold 39. The longer hoses have a higher back pressure at the manifold while the shorter hoses have a lower back pressure. The longer hoses therefore have a reduced product amount flowing therethrough and the shorter hoses have increased product flow.

The present invention therefore provides an air stream balancing apparatus for an air seeder, as schematically illustrated in FIGS. 6-8. An enclosure, illustrated as the plenum 87 of the apparatus 1, has a plurality of output ports 89 and an input port 91 connected to receive the air stream AS from the fan 25. The input end, illustrated as a flange 93, of an output conduit, illustrated as supply hose 23 of the apparatus 1, is connected to each output port 89 through a connection orifice 95 to receive the air stream AS from the plenum 23. An output end of each supply hose 23 is connected to a downstream element of the distribution network of the air seeder, as described above.

Depending on the configuration of the distribution network downstream along each supply hose, the back pressure at the output ports 91 can vary significantly. In order then to balance the air flow into each supply conduit, a desired cross-sectional area of each connection orifice 95 is determined by determining a pressure of the air stream AS in each supply hose 23 and selecting the cross-sectional area of each connection orifice 95 to equalize the pressure of the air stream AS in each supply hose, such that the cross-sectional area of the connection orifices 95 is unequal.

For example where a long supply hose 23 is connected to a first output port 89 through a first connection orifice 95, and a short supply hose 23', with a length less than that of the long supply hose 23, is connected to a second output port 89' through a second connection orifice 95', the cross-sectional area of the first connection orifice 95 is greater than the cross-sectional area of the second connection orifice 95', as schematically illustrated in FIG. 8.

In FIGS. 6-8 the input end of the supply conduit 23 comprises a flange 93 connected to a wall of the plenum 87 over the output port 89 by fasteners 97 through elongated apertures 99 in the flange 93, as illustrated, or in the plenum wall. Alignment of the input end of supply hose 23 and the output port 29 can be adjusted to vary the cross-sectional area of the connection orifice 95. FIG. 8 schematically illustrates the first connection orifice 95 where the output port and the interior of the supply conduit are aligned and the first connection orifice 95 has an area equal to the entire circle indicated. The output port and the interior of the supply conduit are out of alignment to create the second connection orifice 95' with a cross-sectional area that is smaller by the shaded area A in FIG. 8.

A similar air stream balancing apparatus is illustrated in FIG. 9, where the enclosure is one of the manifolds 39 of the apparatus 1. Again the size or cross-sectional area of certain of connection orifices at the manifold output ports 101 compared to others is reduced so that back pressure at the manifold 39 is equal at all output ports 101 regardless of the length of the final hoses, the size of a further manifold being fed, or any other condition farther downstream. It is contemplated that manifolds could be manufactured with outlet ports 101 that vary slightly in size so that a whole network from fan to furrow opener could be tuned to accommodate designed hose lengths and manifold sizes, thus increasing, the available design options rather than is now the case where the output ports of a manifold are all the same size. Alternatively, the invention provides for adjusting the back pressure at manifolds 39 to equalize back pressure at each outlet port 101, as was done with the plenum 87 described above.

In the manifold 39 of FIG. 9, the size of the cross-sectional area of the connection orifice at the output ports 101 can be adjusted to balance the back pressure at all output ports 101. A supply hose 103 is connected to bring an air stream, with agricultural products entrained therein, into the manifold 39. The manifold 39 includes a top cover which is open for illustration. Six output ports 101 are equally spaced about the periphery of the manifold 39 as in the prior art. A gate flap 105 is attached above each output port 101 by a fastener 107 extending through an elongated vertical slot in the wall of the manifold 39 and wing nut 111 threaded onto each screw 107. The gate flap 105 can thus be moved up and down by positioning the screw 107 up or down along the slot, and the position of the gate flap 105 can be determined by looking at the exterior of the manifold 39 to see where the screw 107 is in the slot. The gate flap 105 can thus cover a greater or lesser portion of the output port 101 and thus vary the cross-sectional area of the connection orifice.

When initially setting up an air seeder, the back pressure on each output port 101 can be measured and the gate flaps 105 moved up and down to equalize the back pressure at each output port 101. Product can be conducted through the manifold and measured at each final hose output to check that the distribution is equal.

In some cases an air seeder may have more than one manifold size to conveniently match the number of openers on the seeder. The same air balancing system can be used to decrease the amount of product flow to the smaller manifolds by reducing the size of, or choking, all the runs a small amount while also varying the choke amount for secondary hose lengths.

In systems where there is a first manifold dividing product to be fed into a second manifold for further division, so long as the back pressure at each output port of the first manifold is substantially equal, product will be evenly divided in that manifold, and so it is then required to equalize back pressure at outlets in each downstream second manifold to similarly equalize distribution from the second manifold. In such systems it is further contemplated that that an entire downstream second manifold could be choked somewhat to equalize back pressure at the output ports of a first manifold feeding a plurality of second manifolds.

FIGS. 10-12 schematically illustrate an alternate manifold 39' with a choking sheet 113, illustrated in FIG. 12, installed against the inside surface of the circular manifold wall 117. The choking sheet 113 includes recesses 115 configured such that when installed in the manifold 39', the recesses are substantially aligned with top sides of the output ports 101 in the manifold wall. The choking sheet 113 is made from a flexible plastic or metal sheet material so same can be wrapped around the inside surface of the manifold wall 117, where same is held in position by notches 119 in support members 121 attached to the inside surface of the manifold wall 117.

The size of the recesses is selected to reduce the size or cross-sectional area of the connection orifice 95 at selected output ports 101 by blocking a top portion thereof, as shown at recess 115A, and to leave certain other selected output ports completely open, as shown at recess 115B. The size of the recesses 115 is selected to provide choking of some output ports 101, such as where a shorter final hose provides reduced back pressure, relative to others such as where a longer output hose provides increased back pressure, so that the back pressure at each output port 101 is substantially the same. The size of the recesses 115 in the choking sheet 113 can be calculated when designing the machine for known hose lengths attached to known outlet ports. The recesses 115 can be increased in size if necessary to reduce choking if back pressure measurements during installation warrant by filing the edge of the choking member that forms the recess 115.

Instead of using a flat sheet, a ring with the recesses along a bottom rim thereof could be configured to slide down into the manifold against the inner surface of the manifold wall.

The balancing system, and the apparatuses for practicing the method, provide for greater uniformity in distribution of product to the furrow openers. Once the choke setting is determined and set it should remain the same and not need adjustment unless the hose configuration changes.

Figure 13:
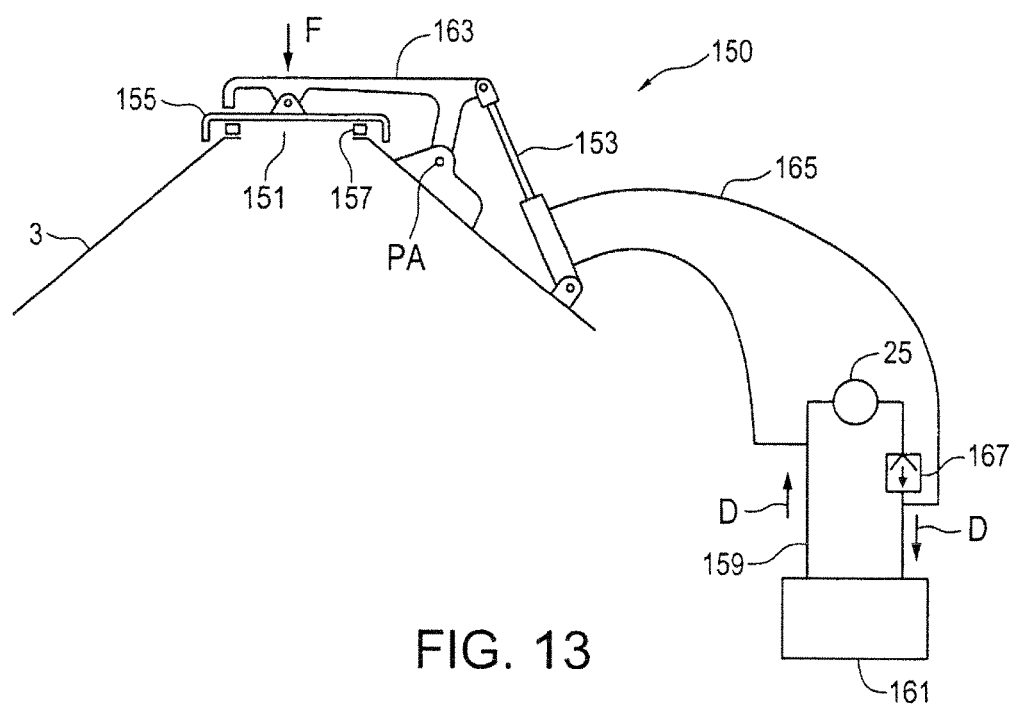
FIG. 13 is a schematic sectional side view of an embodiment of a remotely controlled tank lid apparatus of the present invention with the lid in the closed position.
Figure 14:
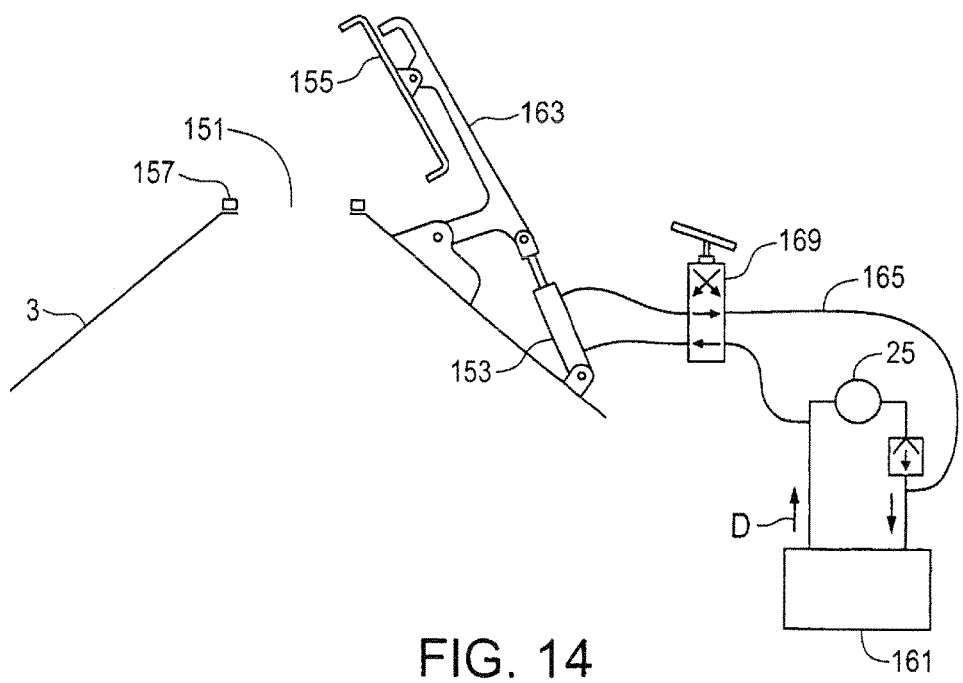
FIG. 14 is a schematic sectional side view of the remotely controlled tank lid apparatus of FIG. 13 with the lid in the open position, and showing an alternate hydraulic connection.

FIGS. 13 and 14 schematically illustrate a remotely controlled lid apparatus 150 for a product tank fill opening 151 of a product tank 3 of the apparatus 1 using a hydraulic cylinder 153 powered from the implement hydraulic system. The apparatus 150 comprises a lid 155 movably attached to the product tank 3 adjacent to the fill opening 151 such that the lid 155 can move from an open position shown in FIG. 14, where the fill opening 151 is open for filling the product tank 3, to a closed position shown in FIG. 13 where the lid 151 covers the fill opening 151. A seal 157 is operative to provide a seal between the lid and edges of the fill opening, and an actuator, provided in the illustrated apparatus 150 by hydraulic cylinder 153, is operative to move the lid 155 between the closed position and the open position, and operative to exert a downward force F on the lid 155 against the seal 157 when the lid 155 is in the closed position.

In illustrated apparatus 150, the fan 25 is operative to create a pressurized air stream to carry agricultural products from the product tank, as described above, and an inside of the product tank 3 is connected to the air stream to equalize pressure between the inside of the product tank 3 and the air stream during operation so that agricultural products can be accurately dispensed by the metering devices. The fan 25 is driven by a hydraulic motor connected by a fan hydraulic conduits 159 to the pressurized hydraulic fluid source 161. An increase in hydraulic pressure in the fan hydraulic conduits 159 causes an increase in fan speed and an increase in a pressure of the air stream, and an increase in the downward force F on the lid 155 against the seal 157.

In the illustrated apparatus 150, an arm 163 is pivotally attached at a mid-point thereof to the product tank about a pivot axis PA, and the lid 155 is a pivotally attached at a lid end of the 163. An end of the hydraulic cylinder 153 is pivotally attached at an opposite cylinder end of the arm 163 such that activating the cylinder 153 to move the cylinder end of the arm 163 upward causes the lid 155 to move down against the seal 157, and the upward force on the cylinder end of the arm 163 exerts the downward force F on the lid 155 against the seal 157.

In the apparatus 150 illustrated in FIG. 13, lid hydraulic conduits 165 connect the hydraulic cylinder 153 to the fan hydraulic conduits 159. When the fan 25 is operating, hydraulic fluid flows in direction indicated by the arrows D, so that the full pressure of the hydraulic fluid in the fan hydraulic conduits 159 is directed to the lower end of the hydraulic cylinder 153 extending the hydraulic cylinder 153 and exerting, through the lid arm 163, the force F on the lid 155 against the compressive seal member 157, so that pressure inside the tank 3 is maintained.

The cylinder 153 can be retracted to open the lid 155 by reversing the hydraulic flow to the fan 25 by moving a valve in the tractor. Reverse flow through the fan 25 is prevented by check valve 167, and the hydraulic fluid flows in the direction opposite to arrows D and the hydraulic cylinder 153 retracts, moving the lid 155 from the closed position of FIG. 13 to the open position of FIG. 14.

An alternate arrangement of the hydraulics for controlling the lid 155 is schematically illustrated in FIG. 14, where the fan 25 is left running at low speed with hydraulic fluid flowing in direction D, but where the lid hydraulic conduits 165 are connected to a control valve 169 which can be located near the tank 3 to allow the operator to open and close the lid 155 at the tank. The valve 169 could also receive hydraulic fluid from another available source rather than the fan source as well if more convenient.

The remotely controlled lid apparatus eliminates the need to climb up and down to open and close tank lid 155. In the illustrated apparatus, the force F on, the lid 155 also conveniently increases with fan speed since increased fan speed requires higher hydraulic pressure. At a higher fan speed, the pressure inside the tank is also higher so the lid closing force F automatically adjusts along with the tank pressure requirements.

Conventional tank lids typically include a clamp to force the lid against a seal to prevent air leakage. These clamps require significant force to close, and so an operator must be standing directly above the lid to exert the force required to close the clamp. These clamps also require periodic adjustment due to structural changes over time in order to prevent leaks. In contrast in the present remote controlled lid apparatus, the force F automatically compensates for structural changes by uniformly applying a downward force when in the seeding mode, and constantly pushing the lid downward ensuring a good seal and reduced risk of air leaking from the tank 3 and bleeding pressure from the air stream. Hydraulic sources other than the fan source could also be used.

The present invention thus provides a number of individually driven meter devices on a single tank. The metering rate for each metering device can be set differently for different sized manifolds. Further, the seed air streams and tanks are completely isolated from the fertilizer air streams and tanks so that largely different air speeds and pressures can be successfully used in the seed and fertilizer air streams. In some embodiments, air pressure at the outlet ports of a plenum or manifold can also be balanced to equalize air and product flow out of each port.

The present invention further provides in some embodiments a simple and economical system for accurately monitoring the product weight in each of a number of air seeder product tanks during operation and also while filling the tank. A remotely controlled lid for a product tank fill opening can, in some embodiments, use hydraulic force from the hydraulic drive fan to exert a constant force on the lid against the compressive seal member and reduce the risk of air leaking from the tank and bleeding pressure from the air stream.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An air seeder distribution apparatus comprising:
    a seed product tank and a fertilizer product tank mounted on a frame for movement along the ground with an air seeder;
    a plurality of seed metering devices mounted on the seed product tank, and a like plurality of fertilizer metering devices mounted on the fertilizer product tank;
    wherein each metering device comprises a feed roller rotatably mounted in a housing and operative, when the feed roller thereof is rotating, to dispense a product flow from the product tank;
    a control operative to selectively start and stop rotation of the feed roller of each metering device;
    a seed manifold set comprising a like plurality of seed manifolds with output ports connected to deliver agricultural products to seed furrows, and a fertilizer manifold set comprising a like plurality of fertilizer manifolds with output ports connected to deliver agricultural products to fertilizer furrows;
    a like plurality of supply hose pairs, each supply hose pair comprising a first supply hose carrying an air stream and a second supply hose carrying an air stream, each supply hose pair extending under one of the plurality of seed metering devices and under one of the plurality of fertilizer metering devices;
    wherein the first supply hose of each hose pair is connected at the output end thereof to the input port of one of the plurality of seed manifolds, and the second supply hose of each hose pair is connected at the output end thereof to the input port of one of the plurality of fertilizer manifolds;
    for each metering device, a Y-fitting in each of the first and second supply hoses of the supply hose pair under the metering device;
    a flexible feed conduit connected at an upper end thereof to an output of the metering device; and
    a switching mechanism operative to connect a lower end of the feed conduit to an upper end of a selected one of the Y-fittings in the first and second supply hoses, and operative to seal the upper end of the other unselected one of the Y-fittings in the first and second supply hoses;
    whereby the product flow from each metering device can be directed into only one of the first and second supply hoses of the supply hose pair extending thereunder, and whereby air flow between the first and second supply hoses is prevented.

2. The apparatus of claim 1 wherein the first supply hose carries a first air stream provided by a first fan and the second supply hose carries a second air stream provided by a second fan.

3. The apparatus of claim 1 wherein the control is operative to substantially simultaneously start and stop rotation of the feed rollers of all metering devices dispensing agricultural products into a selected supply hose.

4. The apparatus of claim 1 wherein the housing of each metering device is mounted under an open bottom of the corresponding product tank such that the metering devices are oriented side by side across the open bottom of the product tank.

5. The apparatus of claim 4 wherein the seed product tank is mounted on a rear portion of the frame and fertilizer product tank is mounted on the frame forward of the seed product tank, and wherein supply hose pairs extend forward from a rear portion of the frame under the seed product tank, then under the fertilizer product tank, then forward to the manifold sets mounted on a furrow opener carrying implement of the air seeder.

6. The apparatus of claim 4 comprising, on each product tank, a rotating driveshaft extending across the metering devices mounted on the product tank and operative to rotate the metering devices, and wherein the control is operative to start and stop rotation of the feed roller of each metering device by engaging and disengaging a shaft of each feed roller with the driveshaft.

7. The apparatus of claim 6 comprising a drive sprocket mounted on the drive shaft adjacent to each metering device, and a driven sprocket mounted on the shaft of each feed roller, and a middle sprocket movable from an engaged position where the middle sprocket engages the drive sprocket and the driven sprocket to rotate the feed roller, and a disengaged position where the middle sprocket is disengaged from at least one of the drive sprocket and the driven sprocket.

8. The apparatus of claim 7 comprising an actuator operative to move the middle sprocket between the engaged and the disengaged positions, and wherein the control is operative to activate the actuator.

* * * * *